US009266461B2

United States Patent
Schmier, II et al.

(10) Patent No.: US 9,266,461 B2
(45) Date of Patent: Feb. 23, 2016

(54) ADJUSTABLE CLAMP

(71) Applicant: The Boeing Company, Chicago, IL (US)

(72) Inventors: Mark A. Schmier, II, Mesa, AZ (US); Curtis R. Estevo, Jr., Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 146 days.

(21) Appl. No.: 14/012,598

(22) Filed: Aug. 28, 2013

(65) Prior Publication Data

US 2015/0060629 A1 Mar. 5, 2015

(51) Int. Cl.
| | |
|---|---|
| *B65D 63/00* | (2006.01) |
| *B60P 7/06* | (2006.01) |
| *F16B 2/06* | (2006.01) |
| *B60P 7/08* | (2006.01) |

(52) U.S. Cl.
CPC . *B60P 7/06* (2013.01); *B60P 7/083* (2013.01); *F16B 2/065* (2013.01); *Y10T 29/49* (2015.01)

(58) Field of Classification Search
CPC ..... F16M 13/02; F16M 11/041; F16M 11/04; B60P 7/06; F16B 2/065; A47F 5/0823; G10D 13/023
See application file for complete search history.

(56) References Cited

U.S. PATENT DOCUMENTS

| | | | |
|---|---|---|---|
| 4,176,830 A | 12/1979 | Isley | |
| 4,407,493 A * | 10/1983 | Okolischan | 269/93 |
| 6,570,074 B1 * | 5/2003 | Rode | 84/413 |
| 2005/0011338 A1 * | 1/2005 | Ortega et al. | 84/414 |
| 2008/0116340 A1 * | 5/2008 | Greene | 248/229.15 |

FOREIGN PATENT DOCUMENTS

WO WO2010045504 A1 4/2010

OTHER PUBLICATIONS

Carr Lane http://carrlane.com/catalog/index.cfm/27025071F0B221118070C1C512D020609090C0015482013180B-041D1E173C3B285351425B.
McMaster-Carr part No. 5138A12.

* cited by examiner

*Primary Examiner* — Brian Mattei

(57) ABSTRACT

A clamp includes a mounting base, a clamp arm, and an adjustable device. The mounting base includes an attachment device for securing the mounting base to a surface. The clamp arm is moveably attached to the mounting base. The adjustable device is moveably attached to the clamp arm. The adjustable device is configured to extend the clamp arm and to retract the clamp arm.

12 Claims, 12 Drawing Sheets

ADJUSTABLE CLAMP

FIELD OF THE DISCLOSURE

This disclosure relates to an adjustable clamp which may be adjusted without having to remount the clamp.

BACKGROUND

The ability to secure or tie down an object or objects for use in transportation, storage, assembly, and fabrication is crucial in many aspects. In one aspect the overall size of an object can dictate the length of a tie-down clamp. Allowing the adjustability of a clamp on assembly or installation of a tarp, cover, bonding jig, vehicle top, storage container, or another object is crucial. Current over-center clamps typically require adjustment and re-adjustment to the clamp upon each use as determined by the size or shape of an object or objects to be secured. In order to adjust one type of over-center clamp, two lock nuts on each end of a pivoting carrier are loosened using additional tools. After this action, a clamping arm of the over-center clamp is adjusted to the appropriate length. Finally, the two lock nuts are re-secured using the additional tools. All of these actions have to be repeated for each installation. This requires much time, effort, and cost.

A clamp and method for use of the clamp is needed to reduce or eliminate one or more issues of one or more of the current clamps.

SUMMARY

In one embodiment, a clamp is disclosed. The clamp includes a mounting base, a clamp arm, and an adjustable device. The mounting base includes an attachment device for securing the mounting base to a surface. The clamp arm is moveably attached to the mounting base. The adjustable device is moveably attached to the clamp arm. The adjustable device is configured to extend the clamp arm and to retract the clamp arm.

In another embodiment, a method is disclosed of using an over-center clamp. In one step, an adjustable device threadedly attached to a clamp arm of an over-center clamp is moved to extend or retract the clamp arm.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
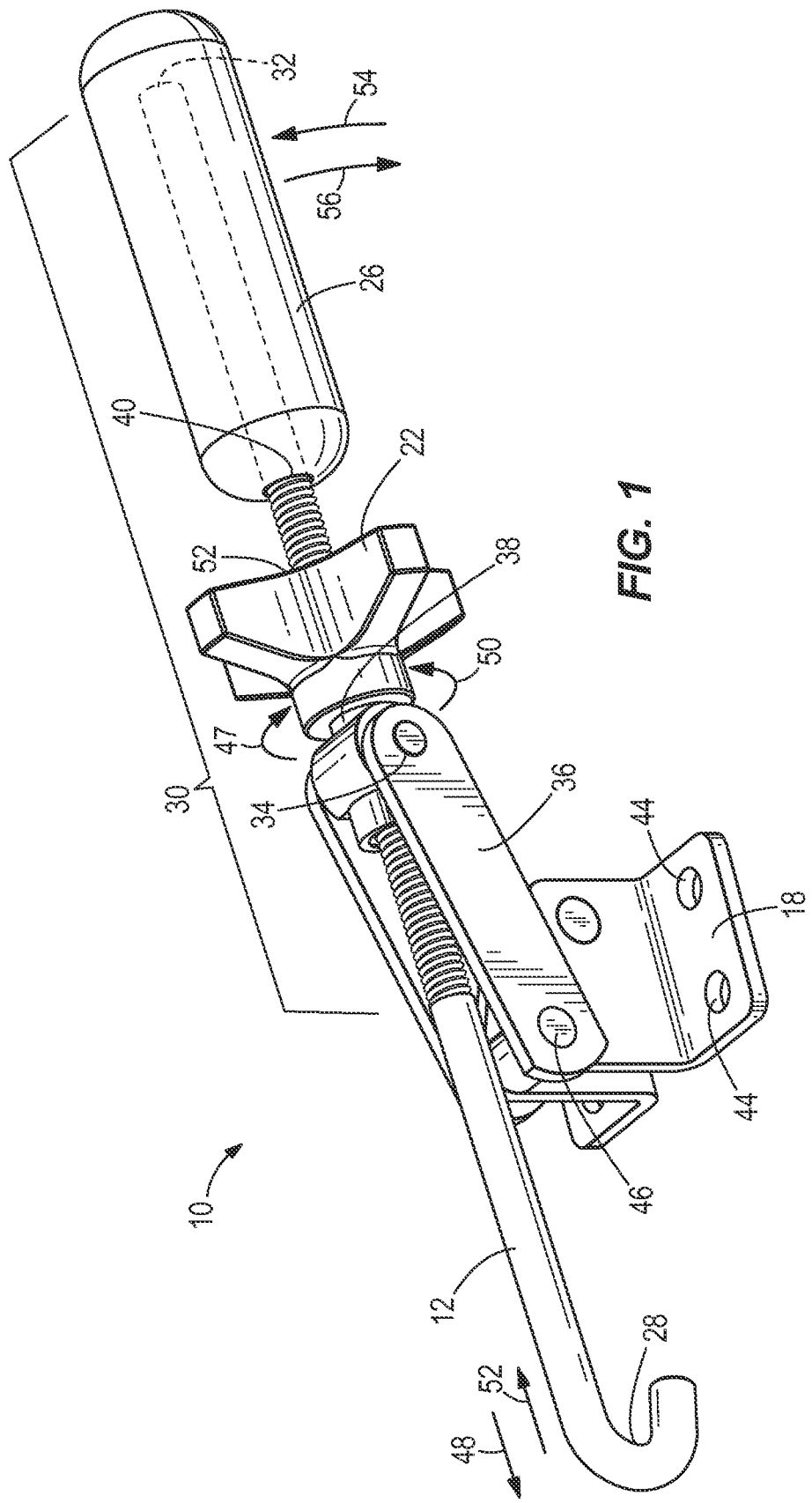
FIG. 1 illustrates a perspective view of one embodiment of a clamp.
Figure 2:
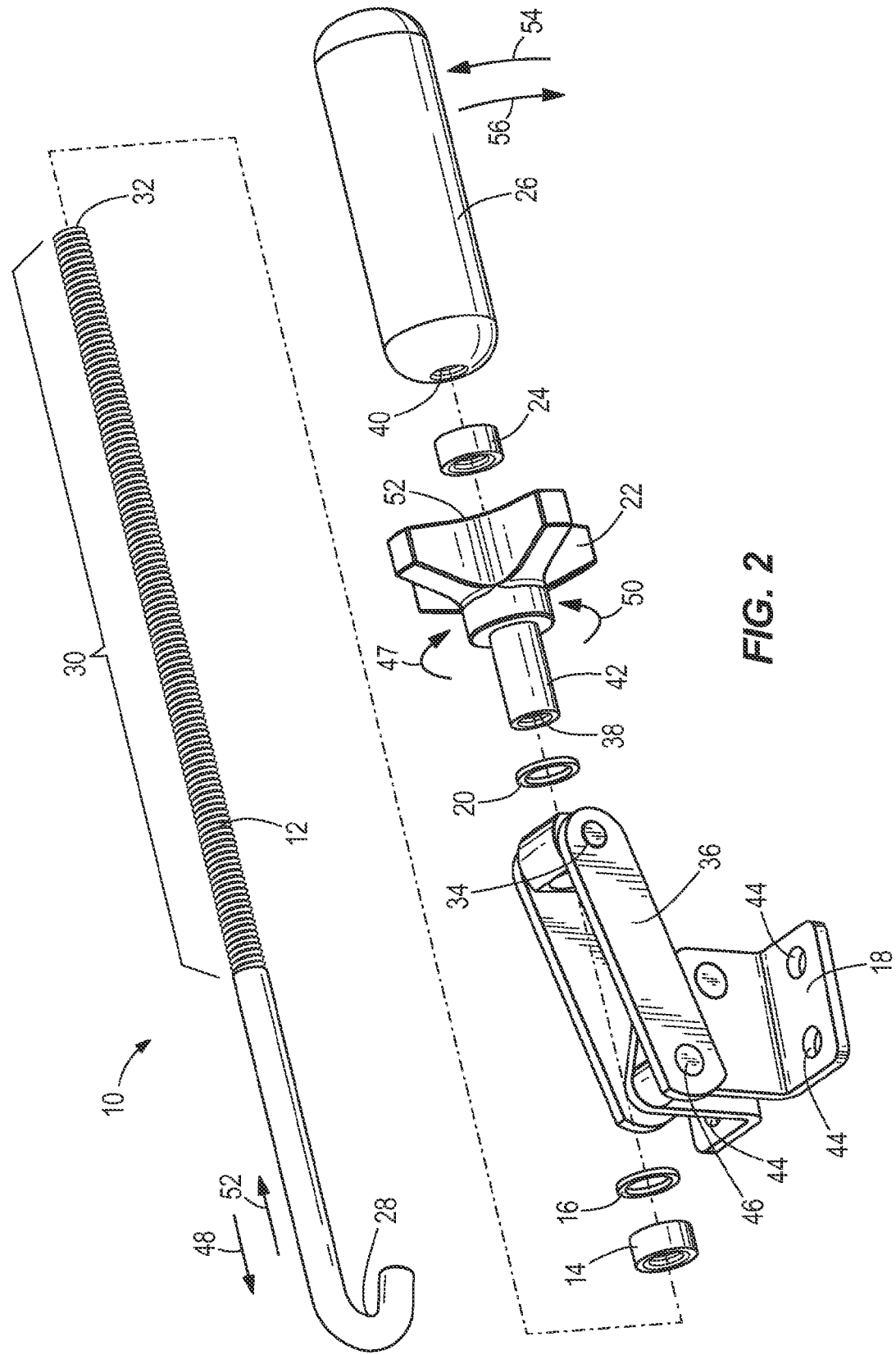
FIG. 2 illustrates a disassembled view of the clamp of the embodiment of FIG. 1.

FIG. 1 illustrates a perspective view of one embodiment of a clamp 10. The clamp 10 may comprise an over-center clamp. FIG. 2 illustrates a disassembled view of the clamp 10 of the embodiment of FIG. 1. As shown collectively in FIGS. 1 and 2, the clamp 10 comprises a clamp arm 12, a locknut 14, a bearing 16, a mounting base 18, a bearing 20, an adjustable device 22, a locknut 24, and a leverage member 26. The clamp 10 may be used to clamp an object by securing an end 28 of the clamp arm 12 to the object. The end 28 of the clamp arm 12 may comprise a hook. In other embodiments, the end 28 of the clamp arm 12 may vary in shape. A portion 30 of the clamp arm 12, including end 32 of the clamp arm 12, is threaded. When assembled, end 32 of the clamp arm 12 is inserted through locknut 14, through bearing 16, through hole 34 in a pivoting base arm 36 of mounting base 18, through bearing 20, through an internal shaft 38 in adjustable device 22, through locknut 24, and into an internal shaft 40 in leverage member 26. It is noted that the threaded portion 30 of the clamp arm 12 threadedly mates with mating threads of the internal shaft 38 of the adjustable device 22, with internal mating threads of the locknut 24, and with mating threads of the internal shaft 40 of the leverage member 26. The threaded portion 30 of the clamp arm 12 does not threadedly mate with any of the other components of the clamp 10.

The adjustable device 22 comprises a hand-knob. In other embodiments, the adjustable device 22 may vary. A threaded end 42 of the adjustable device 22 passes through the bearing 20, through the hole 34 in the pivoting base arm 36, through bearing 16, and threadedly attaches to locknut 14. In such manner, the adjustable device 22 is secured to the pivoting base arm 36 of mounting base 18 due to the bearing 16 and the locknut 14 being larger in size than the hole 34 in the pivoting base arm 36. The mounting base 18 includes attachment devices 44 for securing the mounting base 18 to a surface. The attachment devices 44 comprise holes. In other embodiments, the attachment devices 44 may vary. The pivoting base arm 36 pivots around shaft 46 relative to mounting base 18.

Rotation of the adjustable device 22 in one direction 47 extends the clamp arm 12 away from the mounting base 18 in direction 48. Rotation of the adjustable device 22 in an opposite direction 50 retracts the clamp arm 12 towards the mounting base 18 in direction 52. Once the adjustable device 22 has been rotated the desired amount to extend or retract the clamp arm 12 into the desired location, locknut 24 may be threadedly rotated over the threaded portion 30 of the clamp arm 12 to abut against end 52 of the adjustable device 22 to ensure that the adjustable device 22 does not rotate and back-off the clamp arm 12 further. In another embodiment, instead of locknut 24 the leverage member 26 may be threadedly rotated over the threaded portion 30 of the clamp arm 12 to abut against end 52 of the adjustable device 22 to ensure that the adjustable device 22 does not rotate and back-off the clamp arm 12 further.

Leverage member 26 may be moved in direction 54 to pivot the pivoting base arm 36 and the attached clamp arm 12 in order to open the clamp 10 and moved in opposite direction 56 to pivot the pivoting base arm 36 and the attached clamp arm 12 in order to close the clamp 10. Further, the leverage member 26 may be rotated in direction 50 to threadedly extend the leverage member 26 away from the clamp arm 12 to provide more leverage to open or close the clamp 10, or the leverage member 26 may be rotated in direction 47 opposite to direction 50 to threadedly retract the leverage member 26 towards the clamp arm 12 to provide less leverage to open or close the clamp 10. In still other embodiments, any of the components of the clamp 10 may vary, not be present, or additional components may be used.

Figure 3:
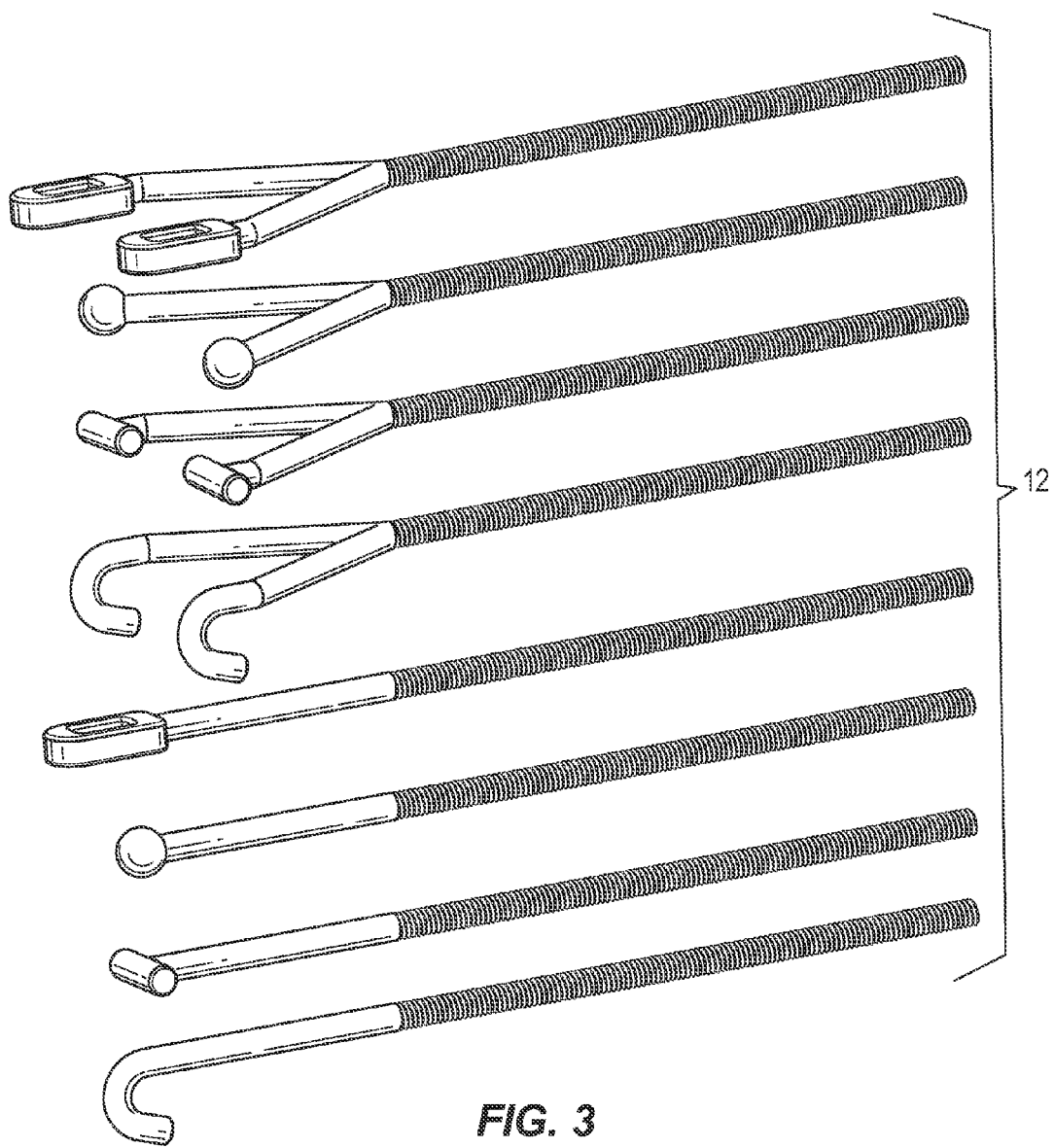
FIG. 3 illustrates a perspective view of varying shaped clamp arms which may be used in the clamp of FIG. 1.

FIG. 3 illustrates a perspective view of varying shaped clamp arms 12 which may be used in the clamp 10 of FIG. 1. In other embodiments, still other varying shaped clamp arms 12 may be used in the clamp 10 of FIG. 1.

Figure 4:
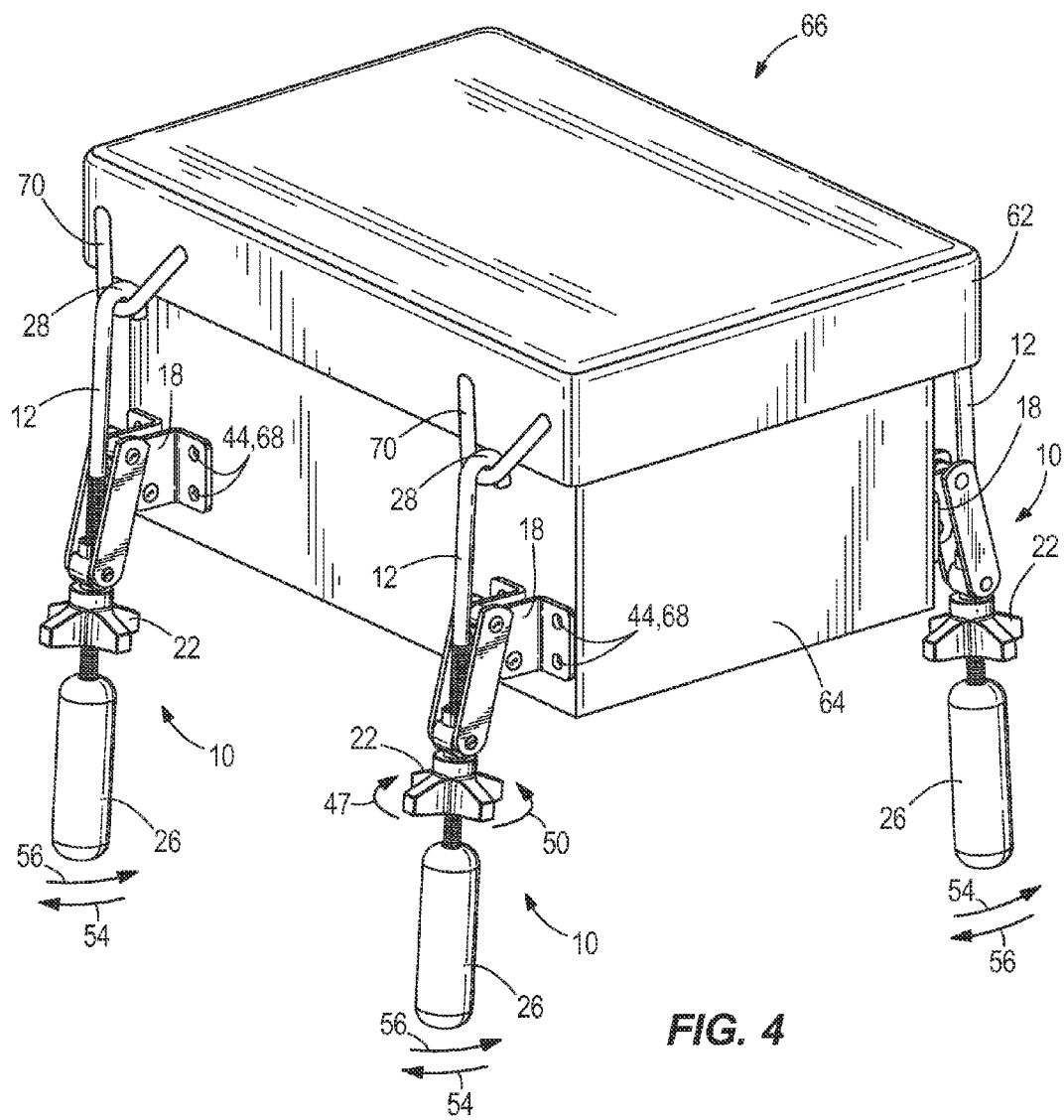
FIG. 4 illustrates a perspective view of multiple of the clamps of FIG. 1 being used to clamp a lid to a base of an object.

FIG. 4 illustrates a perspective view of multiple of the clamps 10 of FIG. 1 being used to clamp a lid 62 to a base 64 of an object 66. As shown, the mounting base 18 of each clamp 10 is attached with fasteners 68 passing through the attachment devices 44 of each mounting base 18 into the base 64. End 28 of each clamp arm 12 is secured onto a respective hook 70 of the lid 62. The adjustable device 22 of each clamp 10 has been rotated in directions 47 or 50 to extend or retract the respective clamp arm 12 of each respective clamp 10 into the desired location relative to the mounting base 18 of each clamp 10. The leverage member 26 of each respective clamp 10 has been moved in direction 56 to put each clamp 10 into a closed position to lock each clamp shut 10 in order to lock the lid 62 to the base 64 of the object 66. In order to remove the clamps 10 from object 66, the leverage members 26 of each respective clamp may be moved in direction 54 to open the clamps 10 from object 66. The fasteners 68 may then be removed from the attachment devices 44 of each mounting base 18 to remove the clamps 10 from the object 66.

Figure 5:
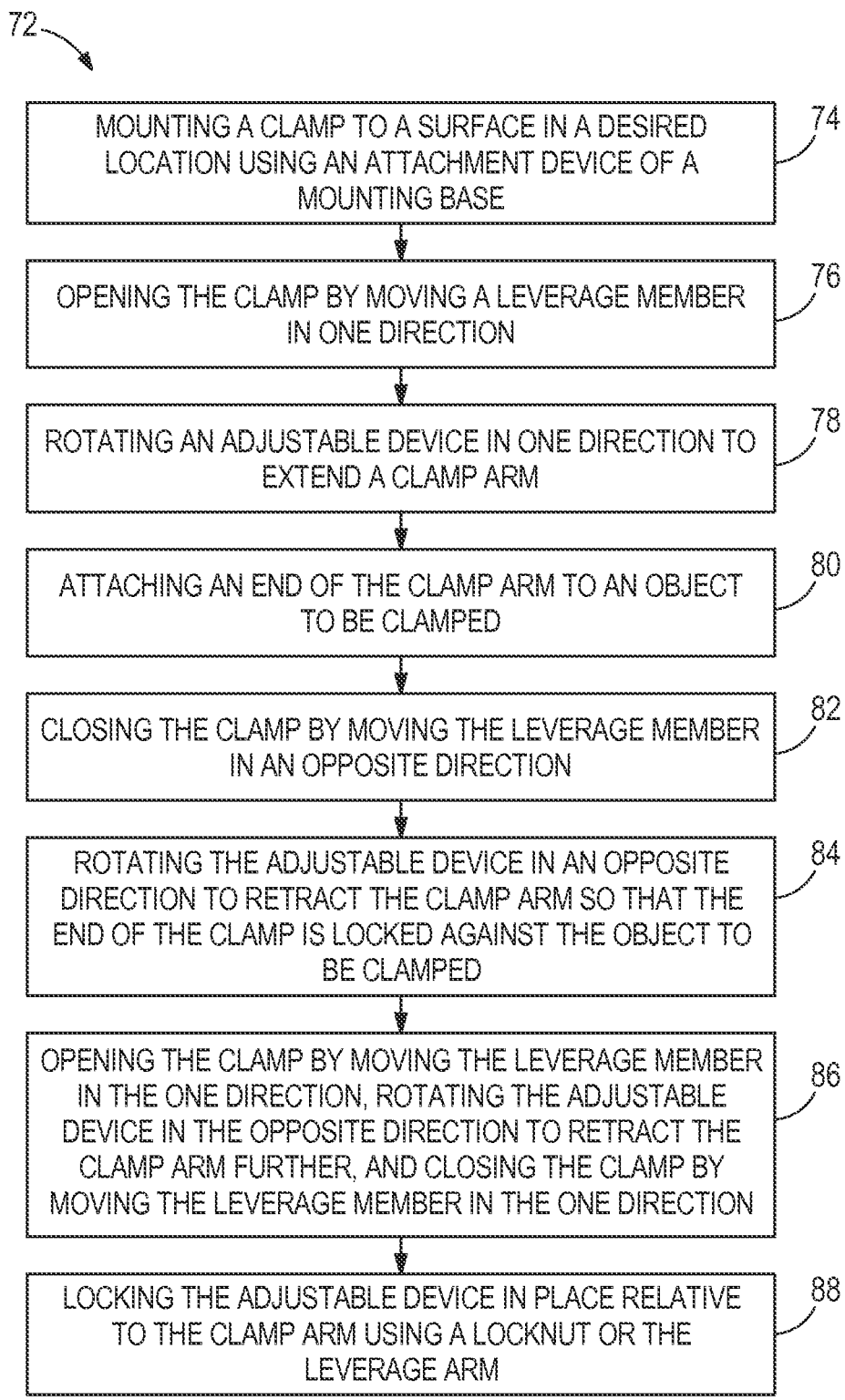
FIG. 5 is a flowchart illustrating one embodiment of a method of using the clamp of FIG. 1.

FIG. 5 is a flowchart illustrating one embodiment of a method 72 of using the clamp of FIG. 1. In step 74, the clamp is mounted to a surface in a desired location using the attachment device of the mounting base. The surface may comprise a surface of the object to be clamped or another surface. In step 76, the clamp is opened by moving the leverage member in one direction. If needed, step 76 may further comprise rotating the leverage member in a first or second direction to extend or retract the leverage member relative to the clamp arm to vary the leverage. In step 78, the adjustable device is rotated in one direction to extend the clamp arm. In step 80, an end of the clamp arm is attached to the object to be clamped. In step 82, the clamp is closed by moving the leverage member in an opposite direction. If needed, step 82 may further comprise rotating the leverage member in a first or second direction to extend or retract the leverage member relative to the clamp arm to vary the leverage.

In step 84, the adjustable device is rotated in an opposite direction to retract the clamp arm so that the end of the clamp is secured or locked against the object to be clamped. In step 86, the clamp is opened by moving the leverage member in the one direction, the adjustable device is rotated in the opposite direction to retract the clamp arm further, and the clamp is closed by moving the leverage member in the one direction. If needed, step 86 may further comprise rotating the leverage member in a first or second direction to extend or retract the leverage member relative to the clamp arm to vary the leverage. Step 86 may be repeated until the desired hold-down force is achieved for the clamp. In step 88, a locknut or the leverage arm is used to lock the adjustable device in place relative to the clamp arm. In other embodiments, one or more steps of the method 72 may be varied in substance or in order, one or more steps may not be followed, or one or more additional steps may be added.

Figure 6:
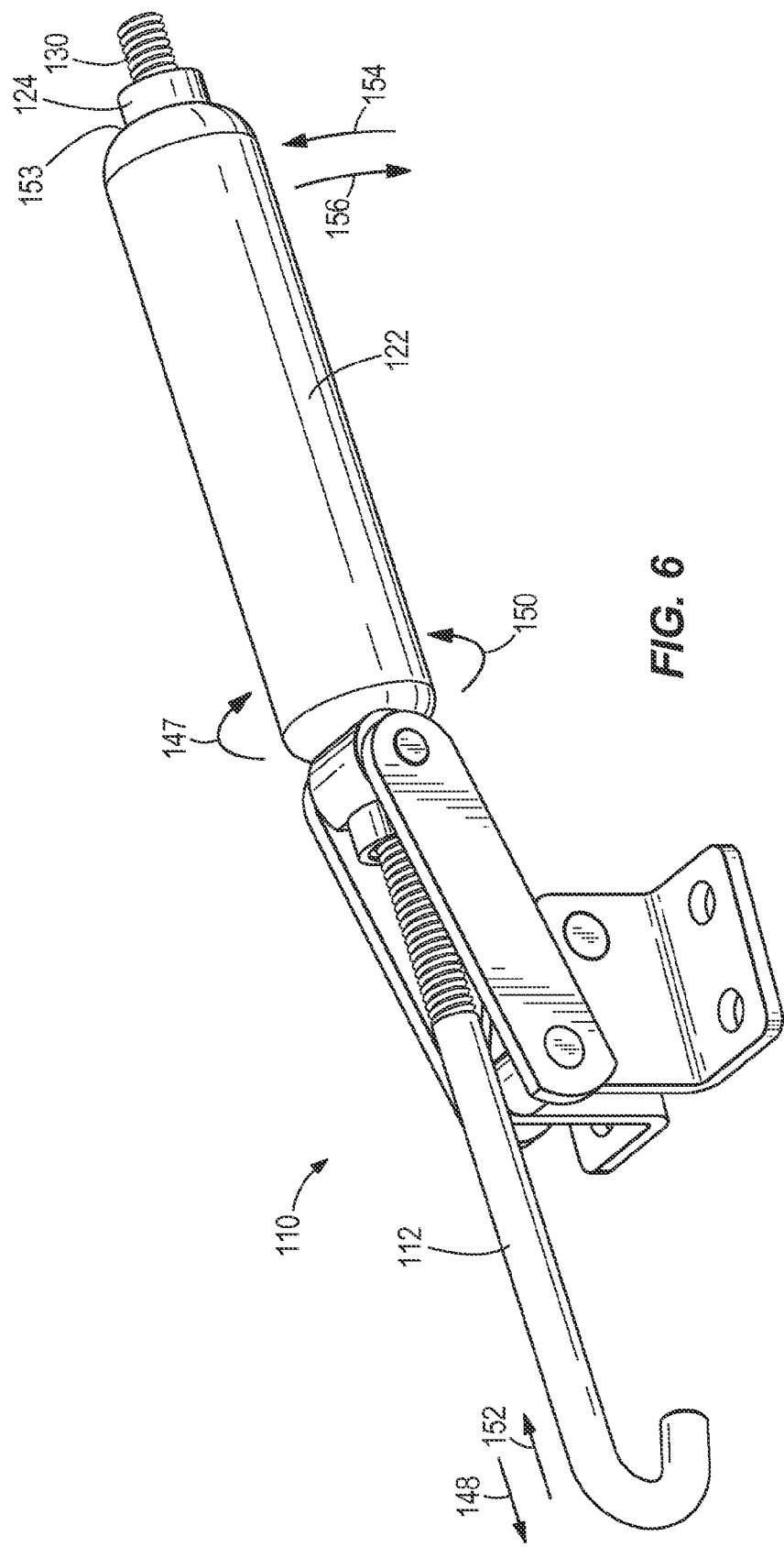
FIG. 6 illustrates a perspective view of another embodiment of a clamp.

FIG. 6 illustrates a perspective view of another embodiment of a clamp 110. The clamp 110 is identical to the clamp 10 of the embodiment of FIG. 1 except that the adjustable device 122 is a hand-grip threadedly attached to the clamp arm 112 instead of a hand-knob, and the separate leverage member 26 of FIG. 1 has been eliminated. In this embodiment, the adjustable device 122 acts as both the mechanism for extending and retracting the clamp arm 112 in respective directions 148 and 152 depending on whether the adjustable device 122 is rotated in direction 147 or in direction 150, and as the leverage member such that when the adjustable device 122 is moved in direction 154 the clamp 110 opens and when the adjustable device 122 is moved in direction 156 the clamp 110 closes. Once the adjustable device 122 has been rotated the desired amount to extend or retract the clamp arm 112 into the desired location, locknut 124 may be threadedly rotated over the threaded portion 130 of the clamp arm 112 to abut against end 153 of the adjustable device 122 to ensure that the adjustable device 122 does not rotate and back-off the clamp arm 112 further. In still other embodiments, any of the components of the clamp 110 may vary, not be present, or additional components may be used.

Figure 7:
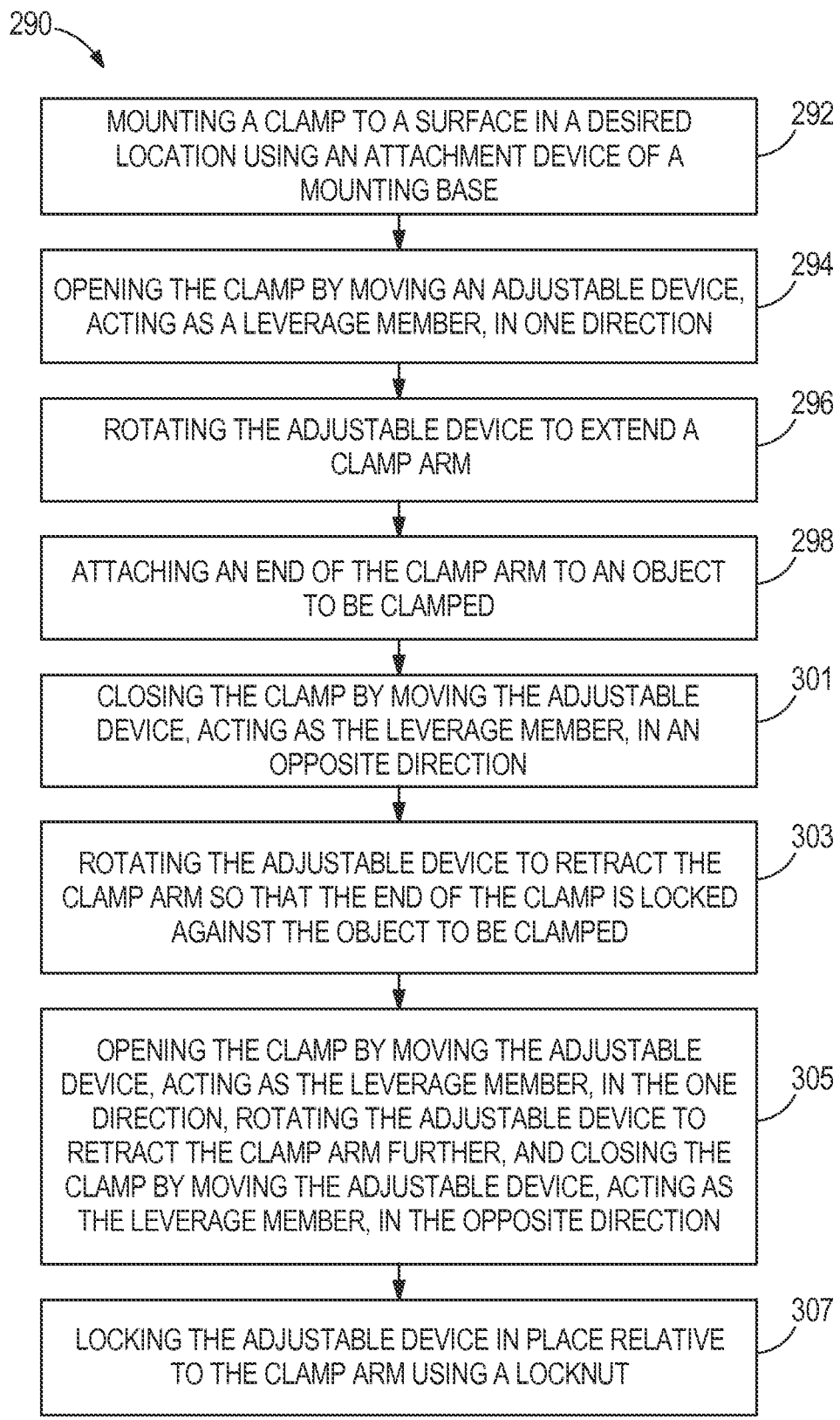
FIG. 7 is a flowchart illustrating one embodiment of a method of using the clamp of FIG. 6.

FIG. 7 is a flowchart illustrating one embodiment of a method 290 of using the clamp of FIG. 6. In step 292, the clamp is mounted to a surface in a desired location using the attachment device of the mounting base. The surface may comprise a surface of the object to be clamped or another surface. In step 294, the clamp is opened by moving the attachment member (acting as the leverage member) in one direction. In step 296, the adjustable device is rotated in one direction to extend the clamp arm. In step 298, an end of the clamp arm is secured or attached to the object to be clamped. In step 301, the clamp is closed by moving the attachment member (acting as the leverage member) in an opposite direction.

In step 303, the adjustable device is rotated in an opposite direction to retract the clamp arm so that the end of the clamp is secured or locked against the object to be clamped. In step 305, the clamp is opened by moving the attachment member (acting as the leverage member) in the one direction, the adjustable device is rotated in the opposite direction to retract the clamp arm further, and the clamp is closed by moving the leverage member (acting as the leverage member) in the opposite direction. Step 305 may be repeated until the desired hold-down force is achieved for the clamp. In step 307, a locknut is used to lock the adjustable device in place relative to the clamp arm. In other embodiments, one or more steps of the method 290 may be varied in substance or in order, one or more steps may not be followed, or one or more additional steps may be added.

Figure 8:
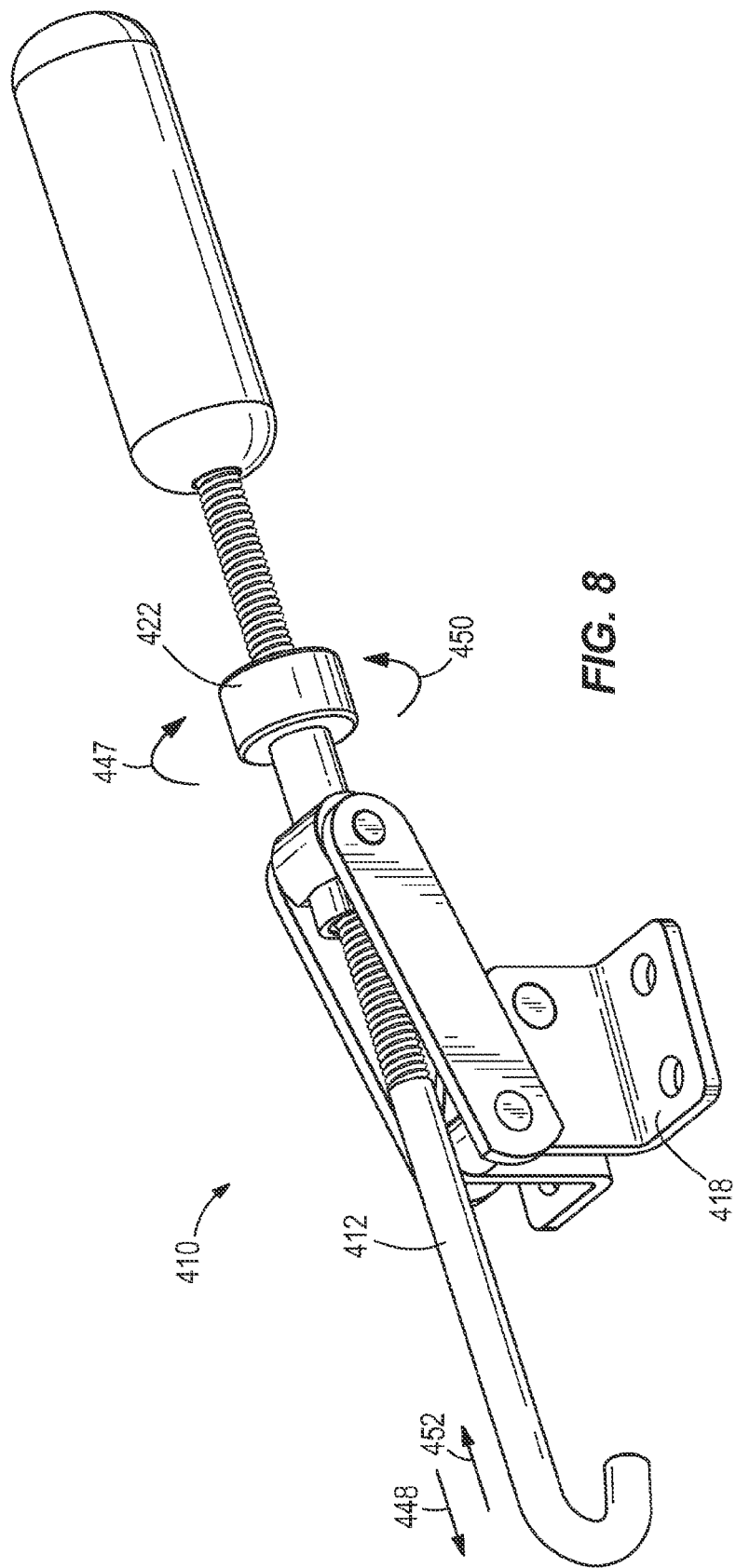
FIG. 8 illustrates a perspective view of another embodiment of a clamp.

FIG. 8 illustrates a perspective view of another embodiment of a clamp 410. The clamp 410 is identical to the clamp 10 of the embodiment of FIG. 1 except that the adjustable device 422 is a torque tension-limiting device threadedly attached to the clamp arm 412 instead of a hand-knob. Rotation of the adjustable device 422 in one direction 447 extends the clamp arm 412 away from the mounting base 418 in direction 448. Rotation of the adjustable device 422 in an opposition direction 450 retracts the clamp arm 412 towards the mounting base 418 in direction 452. The torque tension-limiting device is configured to apply a calibrated tension to the clamp arm 412 so that the force applied to the clamp 410 is precisely as desired. The torque tension-limiting device may be pre-adjusted to the desired torque so that the torque is not exceeded. In one embodiment, the torque tension-limiting device may comprise an off-the-shelf adjustable-torque knob made by CarrLane Manufacturing Company (http://carrlane.com) having any of part numbers CL-4-ATK, CL-5-ATK, CL-6-ATK, CL-8-ATK, CLM-6-ATK, CLM-8-ATK, CLM-10-ATK, or CLM-12-ATK. In still other embodiments, any of the components of the clamp 410 may vary, not be present, or additional components may be used.

Figure 9:
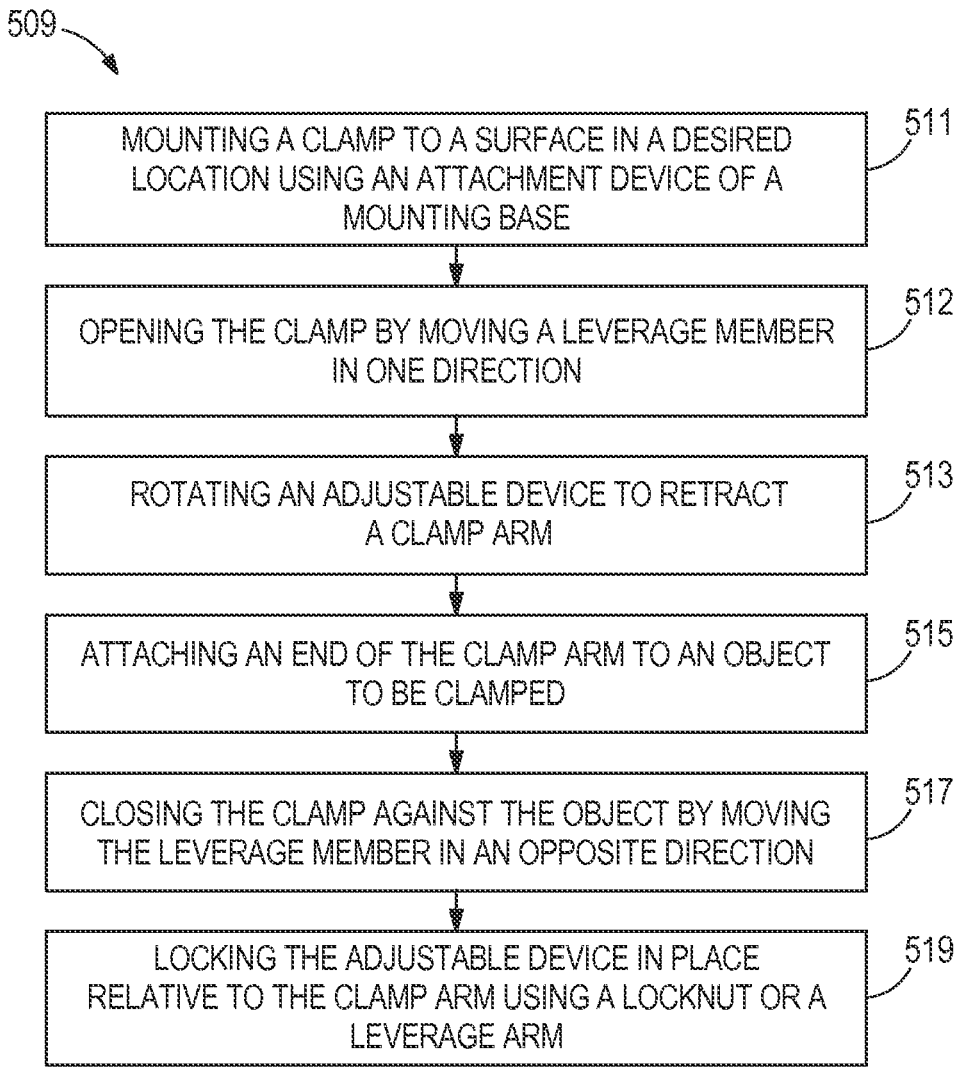
FIG. 9 is a flowchart illustrating one embodiment of a method of using the clamp of FIG. 8.

FIG. 9 is a flowchart illustrating one embodiment of a method 509 of using the clamp of FIG. 8. In step 511, the clamp is mounted to a surface in a desired location using the attachment device of the mounting base. The surface may comprise a surface of the object to be clamped or another surface. In step 512, the clamp is opened by moving the leverage member in one direction. If needed, step 512 may further comprise rotating the leverage member in a first or second direction to extend or retract the leverage member relative to the clamp arm to vary the leverage. In step 513, the adjustable device is rotated to retract the clamp arm. In step 515, an end of the clamp arm is attached or secured to the object to be clamped. In step 517, the clamp is closed against the object by moving the leverage member in an opposite direction. During step 517, the adjustable device comprising the torque tension-limiting device will apply the calibrated desired force to clamp the object with the calibrated desired force. It is noted that the torque tension-limiting device may have been pre-adjusted to the desired torque so that the torque is not exceeded. If needed, step 517 may further comprise rotating the leverage member in a first or second direction to extend or retract the leverage member relative to the clamp arm to vary the leverage. In step 519, a locknut or the leverage arm is used to lock the adjustable device in place relative to the clamp arm. In other embodiments, one or more steps of the method 509 may be varied in substance or in order, one or more steps may not be followed, or one or more additional steps may be added.

Figure 10:
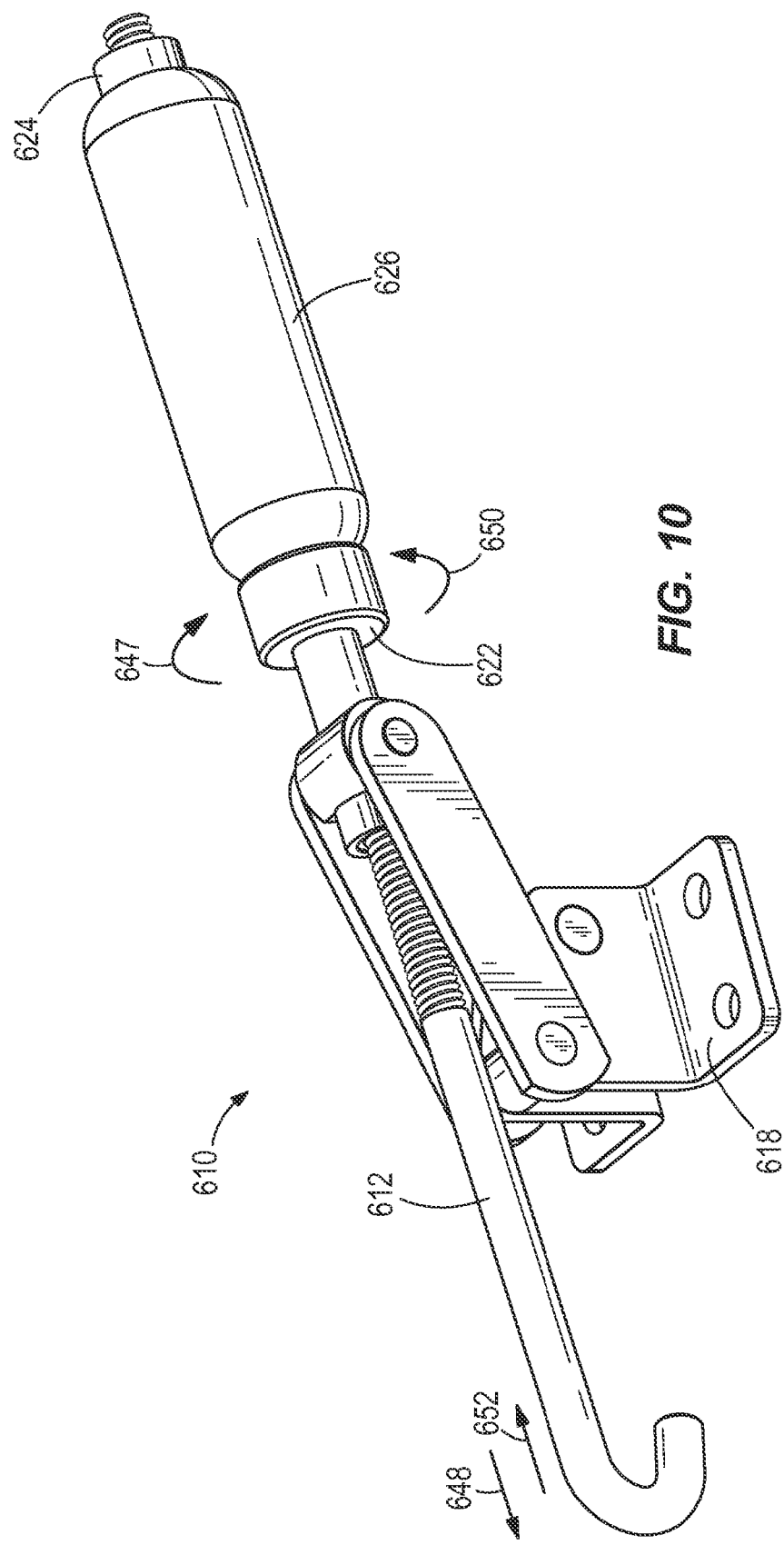
FIG. 10 illustrates a perspective view of another embodiment of a clamp.

FIG. 10 illustrates a perspective view of another embodiment of a clamp 610. The clamp 610 is identical to the clamp 410 of the embodiment of FIG. 8 except that the adjustable device 622 comprising the torque tension-limiting device is attached to the leverage member 626 and the locknut 624 is disposed behind the leverage member 626 instead of between the adjustable device 622 and the leverage member 626. Rotation of the adjustable device 622 in one direction 647 extends the clamp arm 612 away from the mounting base 618 in direction 648. Rotation of the adjustable device 622 in an opposition direction 650 retracts the clamp arm 612 towards the mounting base 618 in direction 652. The torque tension-limiting device is configured to apply a calibrated tension to the clamp arm 612 so that the force applied to the clamp 610 is precisely as desired. The torque tension-limiting device may be pre-adjusted to the desired torque so that the torque is not exceeded. In one embodiment, the torque tension-limiting device may comprise an off-the-shelf adjustable-torque knob made by CarrLane Manufacturing Company (http://carrlane.com) having any of part numbers CL-4-ATK, CL-5-ATK, CL-6-ATK, CL-8-ATK, CLM-6-ATK, CLM-8-ATK, CLM-10-ATK, or CLM-12-ATK. In still other embodiments, any of the components of the clamp 610 may vary, not be present, or additional components may be used.

Figure 11:
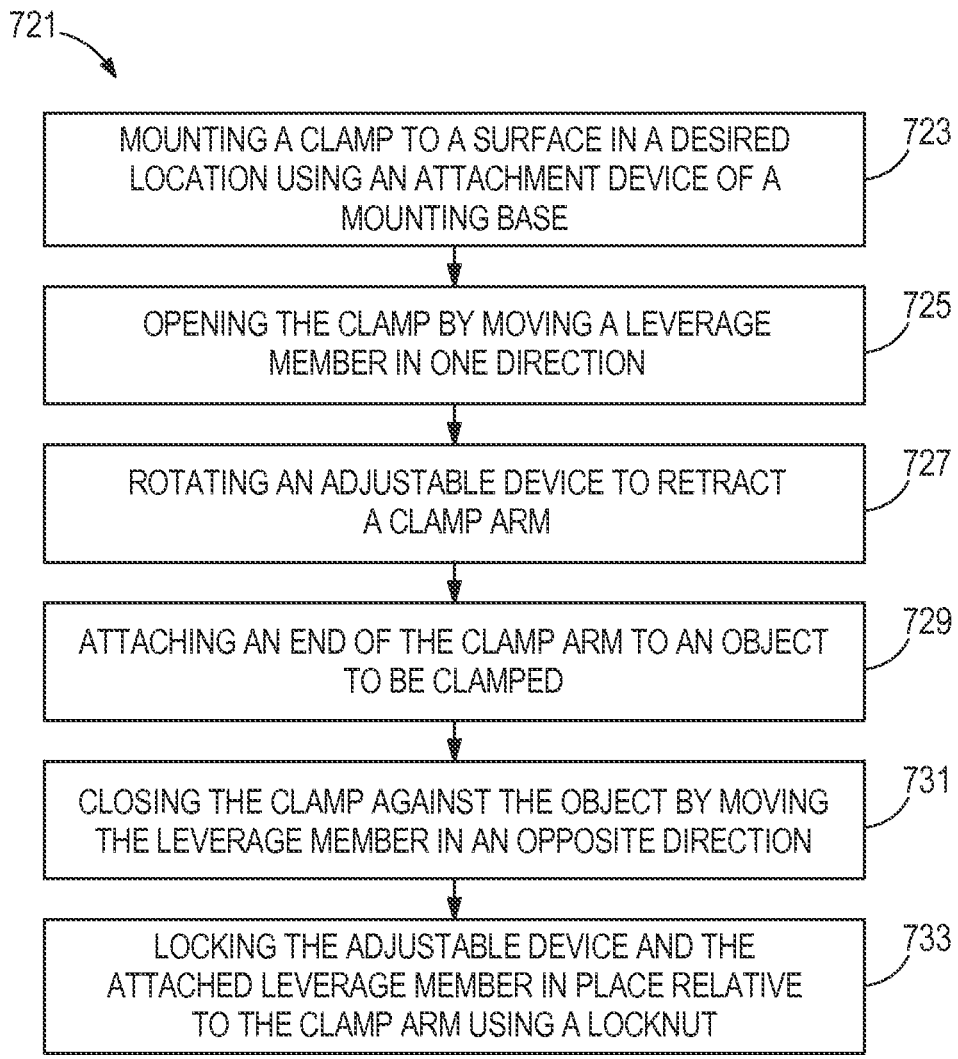
FIG. 11 is a flowchart illustrating one embodiment of a method of using the clamp of FIG. 10.

FIG. 11 is a flowchart illustrating one embodiment of a method 721 of using the clamp of FIG. 10. In step 723, the clamp is mounted to a surface in a desired location using the attachment device of the mounting base. The surface may comprise a surface of the object to be clamped or another surface. In step 725, the clamp is opened by moving the leverage member in one direction. In step 727, the adjustable device is rotated to retract the clamp arm. In step 729, an end of the clamp arm is attached or secured to the object to be clamped. In step 731, the clamp is closed against the object by moving the leverage member in an opposite direction. During step 731, the adjustable device comprising the torque tension-limiting device will apply the calibrated desired force to clamp the object with the calibrated desired force. It is noted that the torque tension-limiting device may have been pre-adjusted to the desired torque so that the torque is not exceeded. In step 733, a locknut is used to lock the adjustable device and the attached leverage member in place relative to the clamp arm. In other embodiments, one or more steps of the method 721 may be varied in substance or in order, one or more steps may not be followed, or one or more additional steps may be added.

Figure 12:
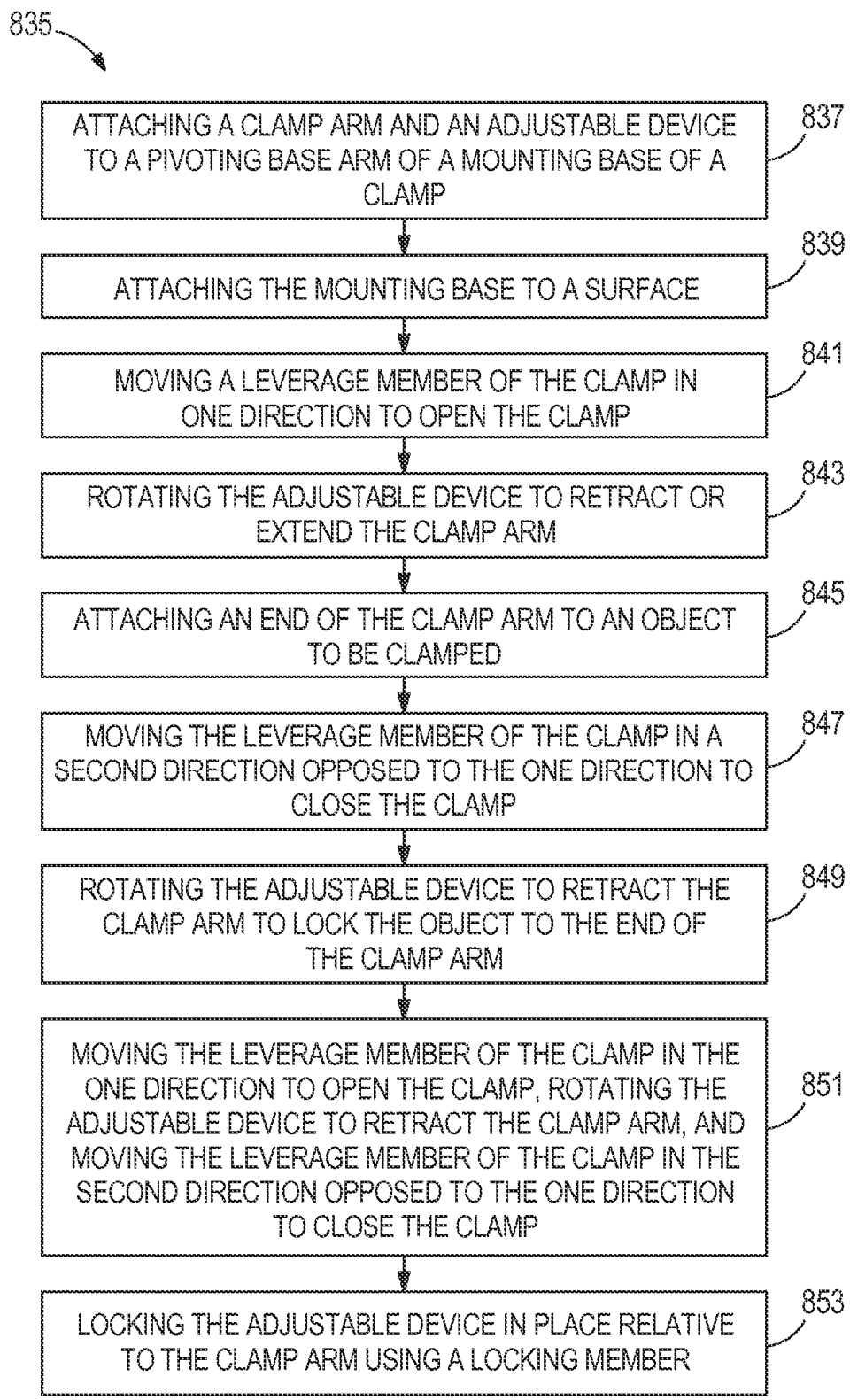
FIG. 12 is a flowchart illustrating another embodiment of a method of using a clamp.

FIG. 12 is a flowchart illustrating another embodiment of a method 835 of using a clamp. The clamp may comprise any of the clamp embodiments disclosed herein. In step 837, a clamp arm and an adjustable device are attached to a pivoting base arm of a mounting base of the clamp. Step 837 further comprises attaching the adjustable device to the clamp arm, and may further comprise attaching a leverage member to the clamp arm. In another embodiment, the adjustable device may serve a dual purpose both as the adjustable device for adjusting extension or retraction of the clamp arm and as the leverage member for opening and closing the clamp. In step 839, the mounting base is attached to a surface. In step 841, the leverage member of the clamp may be moved in one direction to open the clamp. Step 841 may further comprise rotating the leverage member in a first direction to extend the leverage member away from the clamp arm or rotating the leverage member in a second direction opposite to the first direction to retract the leverage member towards the clamp arm.

In step 843, the adjustable device is rotated to retract or extend the clamp arm. The adjustable device may comprise a hand-knob, a hand-grip, a torque tension-limiting device, or another type of adjustable device. In step 845, an end of the clamp arm is attached or secured to an object to be clamped. In step 847, the leverage member of the clamp may be moved in a second direction opposed to the one direction to close the clamp. Step 847 may further comprise rotating the leverage member in a first direction to extend the leverage member away from the clamp arm or rotating the leverage member in a second direction opposite to the first direction to retract the leverage member towards the clamp arm.

In step 849, the adjustable device is rotated to retract the clamp arm to lock or secure the object to the end of the clamp arm. In step 851, the leverage member of the clamp is moved in the one direction to open the clamp, the adjustable device is rotated to retract the clamp arm, and the leverage member of the clamp is moved in the second direction opposed to the one direction to close the clamp. Step 851 may further comprise rotating the leverage member in a first direction to extend the leverage member away from the clamp arm or rotating the leverage member in a second direction opposite to the first direction to retract the leverage member towards the clamp arm. Step 851 is repeated until the desired hold-down force is achieved.

In step 853, a locking member is used to lock the adjustable device in place relative to the clamp arm. The locking member may comprise a locknut, the leverage member, or another type of locking member. In other embodiments, one or more steps of the method 835 may be varied in substance or in order, one or more steps may not be followed, or one or more additional steps may be added. For instance, in one alternative embodiment the adjustable device may comprise a torque tension-limiting device which may apply a calibrated tension to the clamp arm to apply a calibrated desired clamping force to the object and one or more steps of the method 835 may be altered accordingly.

One or more embodiments of the disclosure may allow for a clamp to be adjusted quickly, efficiently, and cost-effectively without requiring additional tools and without having to remount the clamp.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A method of using an over-center clamp mounted to a surface, comprising:
   moving a leverage member in a first direction such that a pivoting arm pivots about a first pivot from a first position to a second position, wherein the pivoting arm includes an adjustable device arranged at a second pivot, and wherein the second pivot is spaced apart from the first pivot; and
   moving the adjustable device threadedly attached to a clamp arm of an over-center clamp to change a distance from a clamping end of the clamp arm to the adjustable device; and
   arranging the clamping end of the clamp arm relative to an object to be clamped;
   moving the leverage member in a second direction opposite the first direction such that the pivoting arm pivots from the second position to the first position, wherein the clamping end moves in a direction along the surface from an open position to a closed position when the pivoting arm pivots from the second position to the first position; and
   locking the adjustable device in place relative to the clamp arm with a locking member.

2. The method of claim 1, wherein the adjustable device comprises a hand-knob, and moving the adjustable device comprises rotating the hand-knob in one direction to increase the distance between the clamping end of the clamp arm and the adjustable device and rotating the hand-knob in an opposite direction to decrease the distance between the clamping end of the clamp arm and the adjustable device.

3. The method of claim 1, wherein the adjustable device comprises a hand-grip, and moving the adjustable device comprises rotating the hand-grip in one direction to increase the distance between the clamping end of the clamp arm and the adjustable device and rotating the hand-grip in an opposite direction to decrease the distance between the clamping end of the clamp arm and the adjustable device.

4. The method of claim 1, wherein the adjustable device comprises a torque tension-limiting device, wherein moving the adjustable device comprises rotating the torque tension-limiting device in one direction to increase the distance between the clamping end of the clamp arm and the adjustable device and rotating the torque tension-limiting device in an opposite direction to decrease the distance between the clamping end of the clamp arm and the adjustable device, and further comprising applying a calibrated tension to the clamp arm using the torque tension-limiting device.

5. The method of claim 1, further comprising attaching a mounting base of the clamp to the surface and attaching the pivoting arm to the mounting base.

6. The method of claim 1, further comprising rotating the leverage member threadedly attached to the clamp arm in a first direction to extend the leverage member away from the clamp arm and rotating the leverage member in a second direction opposite to the first direction to retract the leverage member towards the clamp arm.

7. A method of using an over-center clamp mounted to a surface, comprising:
   moving a leverage member in a first direction such that a pivoting arm pivots about a first pivot from a first position to a second position, wherein the pivoting arm includes an adjustable device arranged at a second pivot, and wherein the second pivot is spaced apart from the first pivot; and
   moving the adjustable device threadedly attached to a clamp arm of an over-center clamp to change a distance from a clamping end of the clamp arm to the adjustable device; and
   arranging the clamping end of the clamp arm relative to an object to be clamped;
   moving the leverage member in a second direction opposite the first direction such that the pivoting arm pivots from the second position to the first position, wherein the clamping end moves in a direction along the surface from an open position to a closed position when the pivoting arm pivots from the second position to the first position; and
   locking the adjustable device in place relative to the clamp arm with a locking member, wherein the locking member comprises a nut which is threadedly attached to one of the clamp arm and the leverage member attached to the clamp arm.

8. The method of claim 7, wherein the adjustable device comprises a hand-knob, and moving the adjustable device comprises rotating the hand-knob in one direction to increase the distance between the clamping end of the clamp arm and the adjustable device and rotating the hand-knob in an opposite direction to decrease the distance between the clamping end of the clamp arm and the adjustable device.

9. The method of claim 7, wherein the adjustable device comprises a hand-grip, and moving the adjustable device comprises rotating the hand-grip in one direction to increase the distance between the clamping end of the clamp arm and the adjustable device and rotating the hand-grip in an opposite direction to decrease the distance between the clamping end of the clamp arm and the adjustable device.

10. The method of claim 7, wherein the adjustable device comprises a torque tension-limiting device, wherein moving the adjustable device comprises rotating the torque tension-limiting device in one direction to increase the distance between the clamping end of the clamp arm and the adjustable device and rotating the torque tension-limiting device in an opposite direction to decrease the distance between the clamping end of the clamp arm and the adjustable device, and further comprising applying a calibrated tension to the clamp arm using the torque tension-limiting device.

11. The method of claim 7, further comprising attaching a mounting base of the clamp to the surface and attaching the pivoting arm to the mounting base.

12. The method of claim 7, further comprising rotating the leverage member threadedly attached to the clamp arm in a first direction to extend the leverage member away from the clamp arm and rotating the leverage member in a second direction opposite to the first direction to retract the leverage member towards the clamp arm.

* * * * *